(12) United States Patent
Muraki et al.

(10) Patent No.: US 9,253,389 B2
(45) Date of Patent: Feb. 2, 2016

(54) IMAGE PICKUP APPARATUS, IMAGE PICKUP SYSTEM, IMAGE PICKUP METHOD AND COMPUTER READABLE RECORDING MEDIUM IMPLEMENTING SYNCHRONIZATION FOR IMAGE PICKUP OPERATIONS

(71) Applicant: CASIO COMPUTER CO., LTD., Tokyo (JP)

(72) Inventors: Jun Muraki, Hamura (JP); Toshio Hanabusa, Kawasaki (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 76 days.

(21) Appl. No.: 13/846,734

(22) Filed: Mar. 18, 2013

(65) Prior Publication Data

US 2014/0002683 A1    Jan. 2, 2014

(30) Foreign Application Priority Data

Jun. 28, 2012 (JP) ................................ 2012-145104

(51) Int. Cl.
*H04N 5/232* (2006.01)
*H04N 5/247* (2006.01)

(52) U.S. Cl.
CPC ....... *H04N 5/23203* (2013.01); *H04N 5/23206* (2013.01); *H04N 5/247* (2013.01)

(58) Field of Classification Search
None
See application file for complete search history.

(56) References Cited

U.S. PATENT DOCUMENTS

| | | | |
|---|---|---|---|
| 7,298,964 B2* | 11/2007 | Ishikawa et al. | 386/223 |
| 2002/0135682 A1* | 9/2002 | Oka et al. | 348/211.3 |
| 2004/0017486 A1* | 1/2004 | Cooper et al. | 348/211.1 |
| 2004/0183908 A1* | 9/2004 | Tominaga et al. | 348/159 |

(Continued)

FOREIGN PATENT DOCUMENTS

| | | |
|---|---|---|
| JP | 2003324649 A | 11/2003 |
| JP | 2005167823 A | 6/2005 |

(Continued)

OTHER PUBLICATIONS

Japanese Office Action dated Apr. 24, 2014 in counterpart Japanese Application No. 2012-145104.

(Continued)

*Primary Examiner* — Sinh Tran
*Assistant Examiner* — Shahbaz Nazrul
(74) *Attorney, Agent, or Firm* — Holtz, Holtz, Goodman & Chick PC

(57) ABSTRACT

Plural image pickup apparatuses can take images in accurate synchronization. An image pickup apparatus is provided with an image pickup unit for obtaining image data, a communication unit for communicating with another image pickup apparatus in synchronization, a synchronous signal generating unit for generating a synchronous signal having a predetermined cycle and synchronized with a timing of a synchronous operation by the communication unit, an image-pickup synchronous signal generating unit for generating an image-pickup synchronous signal having a predetermined cycle and synchronized with the synchronous signal generated by the synchronous signal generating unit, and an image-pickup controlling unit for determining in accordance with the image-pickup synchronous signal generated by the image-pickup synchronous signal generating unit, image-pickup timings at which the image pickup unit obtains image data.

9 Claims, 5 Drawing Sheets

(56) References Cited

U.S. PATENT DOCUMENTS

| | | | |
|---|---|---|---|
| 2005/0151852 A1* | 7/2005 | Jomppanen | 348/218.1 |
| 2006/0146142 A1* | 7/2006 | Arisawa et al. | 348/211.11 |
| 2010/0289951 A1* | 11/2010 | Ryu et al. | 348/500 |
| 2011/0205380 A1* | 8/2011 | Shirakawa | 348/211.9 |
| 2011/0216208 A1* | 9/2011 | Matsuzawa et al. | 348/211.2 |
| 2011/0285864 A1* | 11/2011 | Kashiwa et al. | 348/207.1 |
| 2012/0062755 A1* | 3/2012 | Takahashi et al. | 348/211.11 |

FOREIGN PATENT DOCUMENTS

| | | |
|---|---|---|
| JP | 2006191405 A | 7/2006 |
| JP | 2007208903 A | 8/2007 |
| JP | 2009-296323 A | 12/2009 |

OTHER PUBLICATIONS

Japanese Office Action dated Jul. 16, 2014 issued in counterpart Japanese Application No. 2012-145104.

Japanese Office Action dated Nov. 25, 2014, issued in counterpart Japanese Application No. 2012-145104.

* cited by examiner

IMAGE PICKUP APPARATUS, IMAGE PICKUP SYSTEM, IMAGE PICKUP METHOD AND COMPUTER READABLE RECORDING MEDIUM IMPLEMENTING SYNCHRONIZATION FOR IMAGE PICKUP OPERATIONS

CROSS-REFERENCE TO RELATED APPLICATION

The present application is based upon and claims the benefit of priority from the prior Japanese Patent Application No. 2012-145104, filed Jun. 28, 2012, the entire contents of which are incorporated herein by reference.

BACKGROUND OF THE INVENTION

1. Field of the Invention

The present invention relates to an image pickup apparatus, an image pickup system, an image pickup method and a computer readable non-transitory recording medium.

2. Description of the Related Art

A conventional technique is known, which uses plural high-speed cameras to continuously take images of fast-moving phenomena in synchronization. The fast-moving phenomena include blasts, crashes, burning, crackups and electric discharges.

FIG. 5 is a conceptual diagram for explaining a conventional image pickup system 1, which uses plural image pickup apparatuses to take images in synchronization. The image pickup system 1 consists of the image pickup apparatuses 10a, 10b. The image pickup apparatuses 10a, 10b are used as a master device and a slave device, respectively. When a shutter key is pressed, the image pickup apparatus 10a, at the same time, sends a shutter command to the image pickup apparatus 10b and takes a picture of an object 12 to obtain image data, performing a still image recording process on the image data to record as a pickup image 11a. Meanwhile, when receiving the shutter command from the image pickup apparatus 10a, the image pickup apparatuses 10b takes a picture of the object 12 to obtain image data, performing the still image recording process on the image data to record as a pickup image 11b.

But in the conventional image pickup system 1, since a time lag in data sending and receiving processes and a variation of the time lag are caused in and between the image pickup apparatus 10a and the image pickup apparatuses 10b, it is hard to synchronize the pickup images 11a, 11b. For example, it is almost impossible to obtain a synchronization accuracy of 1/1000 sec.

Japanese Unexamined Patent Publication No. 2009-296323 discloses a technique, which makes plural high-speed cameras take images in synchronization. This conventional technique uses one master camera and plural slave cameras connected to the master camera, and makes the master camera transfer an image synchronizing signal for a high-speed camera to the plural slave cameras, bringing their shooting operations in synchronization.

In the above conventional technique, the master camera is provided with a timing adjusting unit for securing an accurate synchronization. The timing adjusting unit uses a pulse signal to measure a delay time along a transferring route from the master camera to the slave camera, and compensates for the delay time using the measurement result. The conventional technique is used to continuously take images of the fast-moving phenomena such as blasts, crashes, burning, crackups and electric discharges. The conventional technique provides a camera system, which is able to take an image at an extremely high speed of 1,000,000 frames per second and belongs to a classification of the high-speed cameras for the professional use.

But the conventional technique disclosed by Japanese Unexamined Patent Publication No. 2009-296323 involves a problem that requires an accurate and troublesome setting before taking pictures. For example, it requires to previously prepare the pulse signal to measure a delay time for making compensation. In general, this technique has another problem that the technique is too complex for consumers to use in dairy life.

When a method of using a pulse signal to measure a delay time is applied a radio transferring route, an uncertain delay is invited in a digital radio transferring route due to sampling and packet operations, preventing an accurate measurement.

In an analog radio transferring route, the accurate measurement can be made, but a multiple communication between the master device and slave devices is not allowed. Therefore, the same number of radio communication devices as the slave devices have to be provided at the master device, which also invite a problem that increases the cost and power consumption.

SUMMARY OF THE INVENTION

The present invention provides an image pickup apparatus, an image pickup system, an image pickup method and a computer readable non-transitory recording medium, which will make plural image pickup apparatuses take images in accurate synchronization.

According to one aspect of the invention, there is provided an image pickup apparatus, which comprises an image pickup unit for taking an image to obtain image data, a communication unit for communicating with another image pickup apparatus in synchronization, a synchronous signal generating unit for generating a synchronous signal having a predetermined cycle and synchronized with a timing of a synchronous operation by the communication unit, an image-pickup synchronous signal generating unit for generating an image-pickup synchronous signal having a predetermined cycle and synchronized with the synchronous signal generated by the synchronous signal generating unit, and an image-pickup controlling unit for determining in accordance with the image-pickup synchronous signal generated by the image-pickup synchronous signal generating unit, image-pickup timings at which the image pickup unit obtains image data.

According to another aspect of the invention, there is provided an image pickup system including at least a first image pickup apparatus and another image pickup apparatus, the first image pickup apparatus and another image pickup apparatus for obtaining image data in synchronization, wherein the first image pickup apparatus and the another image pickup apparatus each comprise an image pickup unit for taking an image to obtain image data, a communication unit for communicating with the other image pickup apparatus in synchronization, a synchronous signal generating unit for generating a synchronous signal having a predetermined cycle and synchronized with a timing of a synchronous operation by the communication unit, an image-pickup synchronous signal generating unit for generating an image-pickup synchronous signal having a predetermined cycle and synchronized with the synchronous signal generated by the synchronous signal generating unit, an image-pickup controlling unit for determining in accordance with the image-pickup synchronous signal generated by the image-pickup synchronous signal generating unit, image-pickup timings at which the image pickup unit obtains image data, a counting unit for counting from the first the number of frames of image data, which are obtained by the image pickup unit at the image-pickup timings determined by the image-pickup controlling unit, an obtaining unit for obtaining a count value, which has been counted by the counting unit at a time when an image-pickup operation is performed, and a recording controlling unit for associating the image data obtained by the image pickup unit at the time when the image-pickup operation is performed with the count value of the counting unit obtained by the obtaining unit, and for recording the image data associated with the count value of the counting unit, and wherein the first image pickup apparatus further comprises an instruction signal generating unit for generating an instruction signal for giving the another image pickup apparatus an instruction of obtaining and recording image data in synchronization with the image-pickup timing, when the image-pickup operation is performed, and a sending unit for sending the another image pickup apparatus the count value of the counting unit obtained by the obtaining unit together with the instruction signal generated by the instruction signal generating unit, and wherein the another image pickup apparatus further comprises a receiving unit for receiving the count value of the counting unit together with the instruction signal from the first image pickup apparatus, and wherein the recording controlling unit records the image data, which is obtained by the image pickup unit and corresponds to the count value of the counting unit received together with the instruction signal, when the receiving unit receives the instruction signal from the first image pickup apparatus.

According to still another aspect of the invention, there is provided an image pickup method in an image pickup apparatus, the method which comprises an image pickup process of taking an image to obtain image data, a communication process of communicating with another image pickup apparatus in synchronization, a synchronous-signal generating process of generating a synchronous signal having a predetermined cycle and synchronized with a timing of a synchronous operation at the communication process, an image-pickup synchronous signal generating process of generating an image-pickup synchronous signal having a predetermined cycle and synchronized with the synchronous signal generated at the synchronous-signal generating process, and an image-pickup controlling process of determining in accordance with the image-pickup synchronous signal generated at the image-pickup synchronous signal generating process, image-pickup timings at which image data is obtained at the image pickup process.

According to yet another aspect of the invention, there is provided a computer readable non-transitory recording medium mounted on an image pickup apparatus, wherein the image pickup apparatus is provided with a computer and an image pickup unit for taking an image to obtain image data, the non-transitory recording medium having recorded thereon a computer program when read and executed to make the computer implement a process, which comprises a communication process of communicating with another image pickup apparatus in synchronization, a synchronous-signal generating process of generating a synchronous signal having a predetermined cycle and synchronized with a timing of a synchronous operation at the communication process, an image-pickup synchronous signal generating process of generating an image-pickup synchronous signal having a predetermined cycle and synchronized with the synchronous signal generated at the synchronous-signal generating process, and an image-pickup controlling process of determining in accordance with the image-pickup synchronous signal generated at the image-pickup synchronous signal generating process, image-pickup timings at which the image pickup unit obtains image data.

According to the present invention, an advantage can be enjoyed, that accurately synchronizes the timings at which plural image pickup apparatuses take images.

DETAILED DESCRIPTION OF THE PREFERRED EMBODIMENTS

The preferred embodiments of the present invention will be described with reference to the accompanying drawings in detail.

A. Configuration of Embodiment

Figure 1:
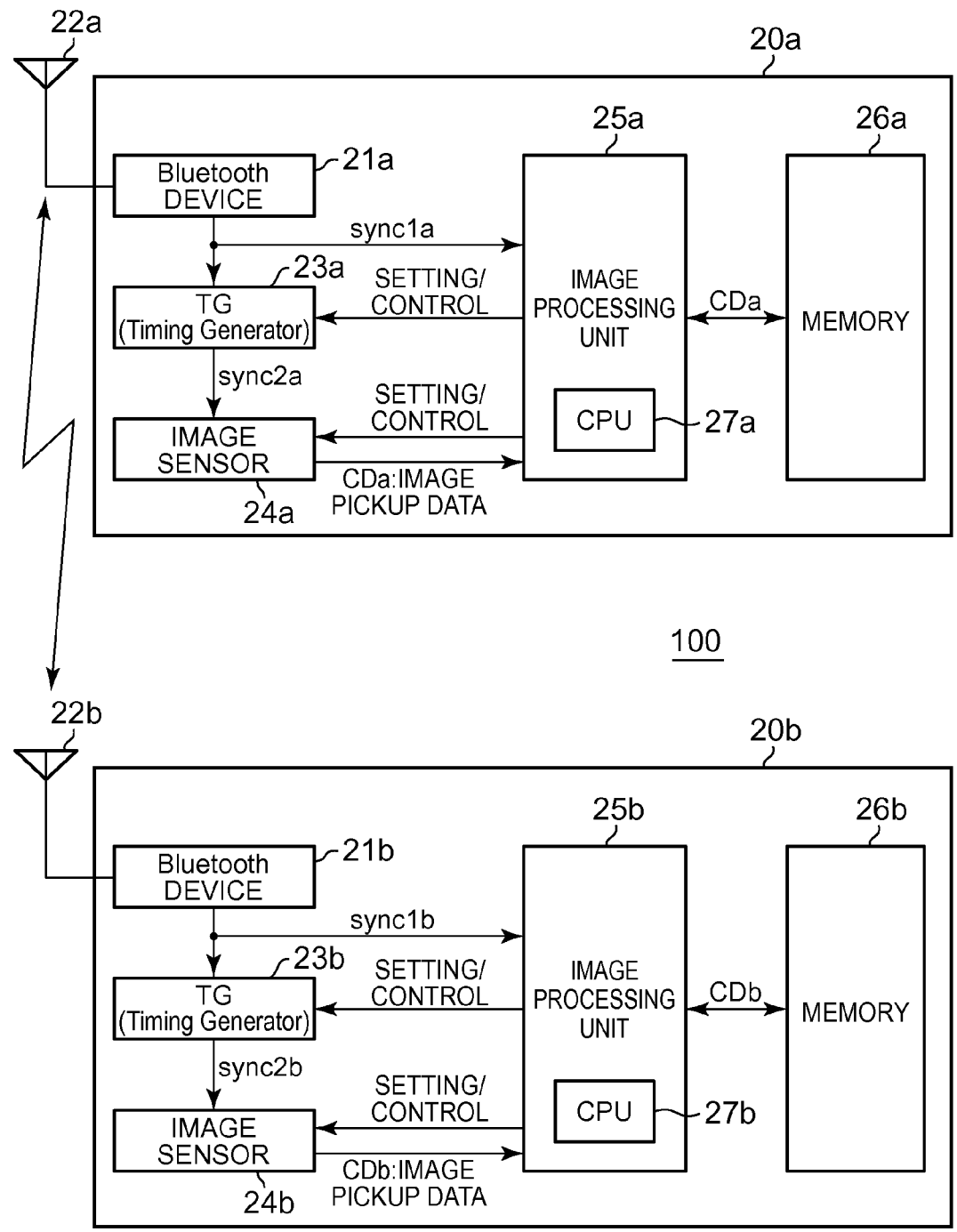
FIG. 1 is a block diagram showing a configuration of an image pickup system 100 according to the present embodiment of the invention, which image pickup system 100 comprises plural image pickup apparatuses 20a, 20b.

FIG. 1 is a block diagram showing a configuration of an image pickup system 100 according to the present embodiment of the invention. The image pickup system 100 comprises plural image pickup apparatuses 20a, 20b. As shown in FIG. 1, the image pickup apparatuses 20a, 20b comprise Bluetooth (Registered trademark) devices (hereinafter, referred to as "BT devices") 21a, 21b, antennas 22a, 22b, TG (Timing generators) 23a, 23b, image sensors 24a, 24b, image processing units 25a, 25b, and memories 26a, 26b, respectively.

BT devices 21a, 21b are radio communication devices in conformity with one of general synchronous digital radio communication systems. BT devices 21a, 21b are used to perform communicating operations in a synchronous communication system between the image pickup apparatuses 20a, 20b at the same timing, respectively. BT devices 21a, 21b generate pulse signals every 250 ms based on synchronous operation timings in the synchronous communication system, and supply the pulse signals to TG (Timing generators) 23a, 23b and the image processing units 25a, 25b, respectively. These pulse signals are referred to as BT synchronous signals sync 1a, sync 1b, respectively. The linked image pickup apparatuses 20a, 20b generate BT synchronous signals sync 1a, sync 1b at the same timing in response to the operations of BT devices 21a, 21b, respectively.

Upon receipt of BT synchronous signals sync 1a, sync 1b as trigger signals, the image processing units 25a, 25b control operations of TG (Timing generators) 23a, 23b, and send commands, respectively.

TG (Timing Generators) 23a, 23b generates image-pickup synchronous signals sync 2a, sync 2b having a predetermined cycle and synchronized with BT synchronous signals sync 1a, sync 1b, respectively. Each of the image-pickup synchronous signals sync 2a, sync 2b contains horizontal and vertical synchronous signals. That is, TG (Timing Generators) 23a, 23b make the image processing units 25a, 25b generate the image-pickup synchronous signals sync 2a, sync 2b at a desired pre-set synchronous-signal generating timing, respectively. Further, TG (Timing Generators) 23a, 23b start generating the image-pickup synchronous signals sync 2a, sync 2b in synchronism with BT synchronous signals sync 1a, sync 1b, respectively.

The image sensors 24a, 24b operates in accordance with the image-pickup synchronous signals sync 2a, sync 2b sent from TG (Timing Generators) 23a, 23b. Each of the image sensors 24a, 24b performs an exposure operation under a predetermined condition, A/D conversion, and data transferring operation.

In the present embodiment, the image pickup apparatus 20a operates as a master device and the image pickup apparatuses 20b operates as a slave device. The image pickup apparatus 20a (master device) sends the image pickup apparatus 20b (slave device) an instruction of starting a through operation and/or an instruction of starting recording a still image by means of radio communication by BT devices 21a, 21b. In this case, communication devices other than Bluetooth (Registered trademark) devices 21a, 21b can be used to send or receive the instructions of starting a through operation and/or starting recording a still image.

The image processing units 25a, 25b have CPU (Central Processing Unit) 27a, 27b for executing given programs to control operations of blocks and perform various processes. The image sensors 24a, 24b successively send image-pickup data CDa, CDb of each frame to the image processing units 25a, 25b, respectively. The image processing units 25a, 25b successively receive the image-pickup data CDa, CDb from the image sensors 24a, 24b and store the received image-pickup data in the memories 26a, 26b, respectively. The image-pickup data CDa, CDb are successively stored in ring buffers provided in the memories 26a, 26b. Each ring buffer has a size for storing 10 frames of image-pickup data CDa, CDb.

Figure 2:
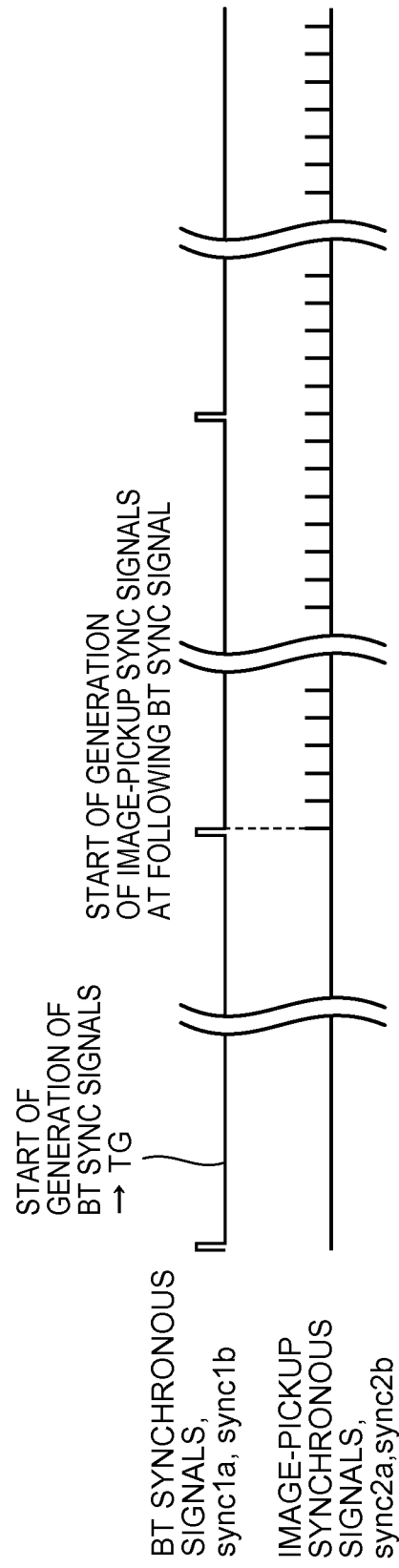
FIG. 2 is a conceptual diagram showing a relationship between BT synchronous signals (BT sync signals) sync 1a, sync 1b and image-pickup synchronous signals (image-pickup sync signals) sync 2a, sync 2b in the image pickup apparatuses 20a, 20b of the image pickup system 100 according to the present embodiment of the invention.

FIG. 2 is a conceptual diagram showing a relationship between BT synchronous signals sync 1a, sync 1b and the image-pickup synchronous signals sync 2a, sync 2b in the image pickup apparatuses 20a, 20b of the image pickup system 100 according to the present embodiment of the invention. TG (Timing Generators) 23a, 23b have a fine adjusting function for making adjustment such that a frequency per sec. of generation of synchronous signals of BT synchronous signal sync 1a and the frequency of BT synchronous signal sync 1b will be equivalent to each other. In the image pickup apparatuses 20a, 20b, TG (Timing Generators) 23a, 23b generate the image-pickup synchronous signals sync 2a, sync 2b at the same timing in synchronism with BT synchronous signals sync 1a, sync 1b, respectively.

B. Operation of Embodiment

Operation of the embodiment will be described with reference to the accompanying drawings in detail.

Figure 3:
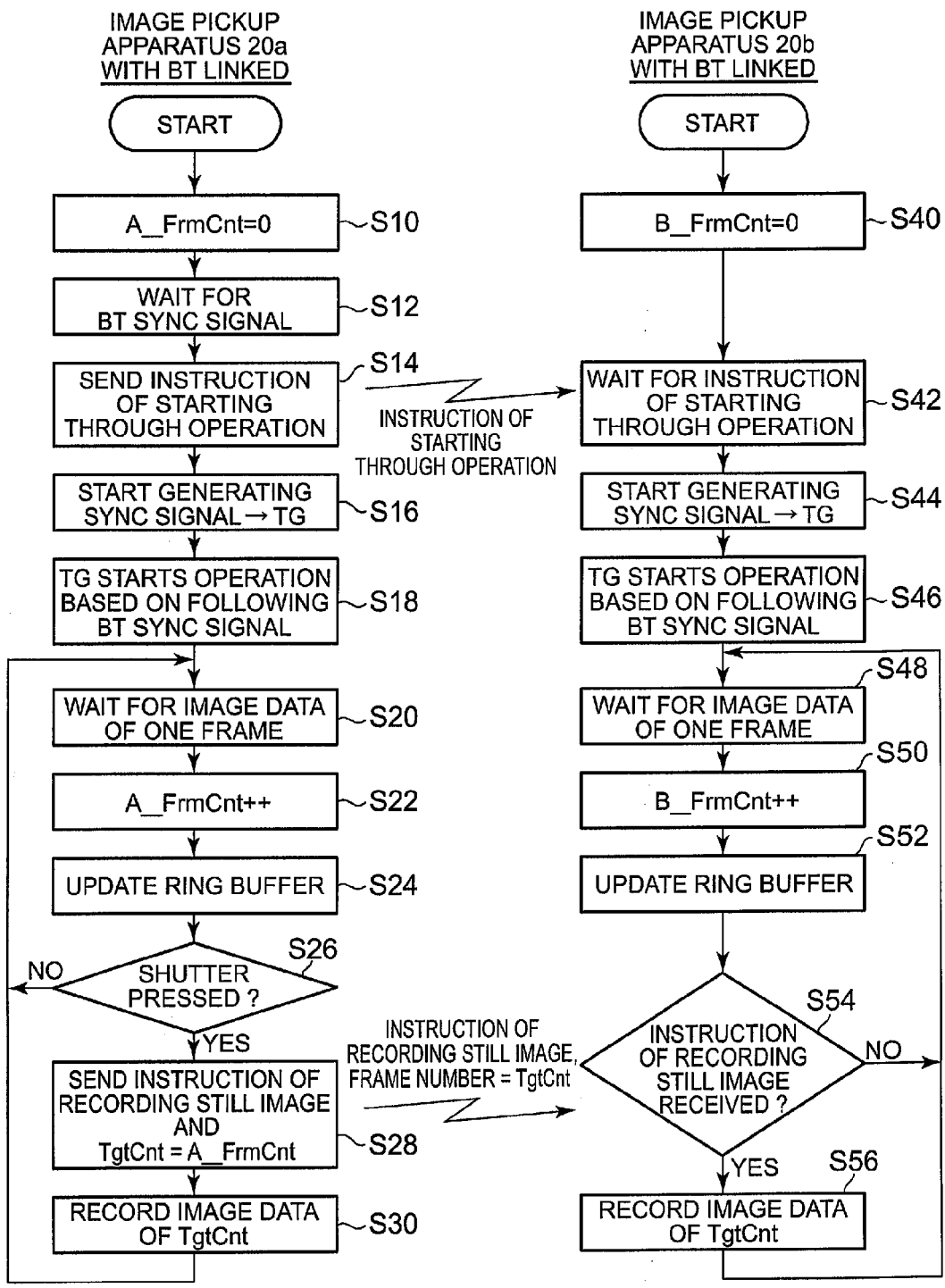
FIG. 3 is a flow chart of operations performed by the image pickup apparatuses 20a, 20b of the image pickup system 100 according to the embodiment of the invention.

FIG. 3 is a flow chart of operations performed by the image pickup apparatuses 20a, 20b of the image pickup system 100 according to the embodiment of the invention. It is presumed that the image pickup apparatuses 20a, 20b are held in a state, in which BT devices 21a, 21b are properly linked to each other. A synchronous image-pickup mode of the image pickup apparatus 20a is set to "master" and a synchronous image-pickup mode of the image pickup apparatus 20b is set to "slave" and standby state in response to operation of a user. The image pickup apparatuses 20a, 20b set in the state described above operate in accordance with flowchart of FIG. 3.

In the image pickup apparatus 20a, the image processing unit 25a sets a frame counter A frmCnt to "0" (step S10), and waits for BT synchronous signal sync 1a sent from BT device 21a (step S12). Immediately thereafter, the instruction of starting the through operation is sent from the image pickup apparatus 20a to the image pickup apparatus 20b (step S14). Then, in the image pickup apparatus 20a, the image processing unit 25a controls TG (Timing Generator) 23a so as to start generating the synchronous signal (step S16). The frame counter A frmCnt indicates a serial number of the frames of images taken by the image pickup apparatus 20a after TG (Timing Generator) 23a has started generating the synchronous signal.

Meanwhile, in the image pickup apparatus 20b, the image processing unit 25b sets a frame counter B frmCnt to "0" (step S40), and waits for the instruction of starting the through operation sent from the image pickup apparatus 20a (step S42). Upon receipt of the instruction of starting the through operation, the image processing unit 25b in the image pickup apparatus 20b controls TG (Timing Generator) 23b so as to start generating the synchronous signal in the same manner as in the image pickup apparatus 20a (step S44). The frame counter B frmCnt indicates the serial number of the frames of images taken by the image pickup apparatus 20b after TG (Timing Generator) 23b has started generating the synchronous signal.

In the image pickup apparatuses 20a, 20b, TG (Timing Generators) 23a, 23b start generating the image-pickup synchronous signals sync 2a, sync 2b in accordance with the following BT synchronous signals sync 1a, sync 1b, respectively (step S18, step S46). In the image pickup apparatuses 20a, 20b, the image sensors 24a, 24b starts the exposure operation, image-pickup operation, A/D conversion, data transferring operation in synchronism with the image-pickup synchronous signals sync 2a, sync 2b, respectively (step S20 to step S30 and step S48 to step S56). Hereinafter, these operations will be described in detail.

In the image pickup apparatus 20a, the image processing unit 25a waits for the image-pickup data of one frame sent from the image sensor 24a (step S20), and increments the frame counter A frmCnt after receipt of the image-pickup data of one frame (step S22). The number of the frame indicated by the frame counter A frmCnt is written in a table (not shown) corresponding to a location where the image pickup data is stored. Then the ring buffer of the memory 26a is updated (step S24). In other words, an address in the memory 26a where the image pickup data is stored is updated to the following address.

The image processing unit 25a judges whether or not a shutter key (not shown) has been pressed (step S26). When the shutter key has not been pressed (NO at step S26), the image processing unit 25a returns to step S20, and waits for image pickup data.

Meanwhile, when the shutter key has been pressed (YES at step S26), the image processing unit 25a substitutes the latest value of the frame counter A frmCnt into a counter TgtCnt, and sends the latest value of the frame counter A frmCnt (a value of the counter TgtCnt) to the image processing unit 25b together with the instruction of starting of recording a still image (step S28). Then, the image processing unit 25a performs a still-image recording process on the image pickup data corresponding to the counter TgtCnt in the ring buffer of the memory 26a (step S30), and then returns to step S20, waiting for image pickup data.

As described above, the image pickup apparatus 20a records image pickup data in the ring buffer, which data is successively obtained before the shutter key has been pressed. When the shutter key has been pressed, the image pickup data is stored, corresponding to the latest value of the counter TgtCnt indicated at the time when the shutter key has been pressed.

Meanwhile, the image pickup apparatus 20b performs the following processes substantially in the same manner as in the image pickup apparatus 20a. In the image pickup apparatus 20b, the image processing unit 25b waits for the image-pickup data of one frame sent from the image sensor 24b (step S48), and increments the frame counter B frmCnt after receipt of the image-pickup data of one frame (step S50). The number of the frame indicated by the frame counter B frmCnt is written in the table (not shown) corresponding to a location where the image pickup data is stored. Then the ring buffer of the memory 26b is updated (step S52). In other words, an address in the memory 26b where the image pickup data is stored is updated to the following address.

In the image pickup apparatus 20b, the image processing unit 25b judges whether or not the instruction of recording a still image has been received from the image pickup apparatus 20a (step S54). When no instruction of recording a still image has been received from the image pickup apparatus 20a (NO at step S54), the image processing unit 25b returns to step S48, waiting for image pickup data.

When the instruction of recording a still image has been received from the image pickup apparatus 20a (YES at step S54), the image processing unit 25b obtains from the table the location corresponding to the value of the counter TgtCnt which is received from the image processing unit 25a together with the instruction of recording a still image, and reads the image pickup data from such location, performing the still image recording process on the image pickup data (step S56). Then, the image processing unit 25b returns to step S48, waiting for image pickup data.

As described above, the image pickup apparatus 20b successively records image pickup data in the ring buffer, before the instruction of recording a still image has been received from the image pickup apparatus 20a. When receiving the instruction of recording a still image from the image pickup apparatus 20a, the image pickup apparatus 20b stores the image pickup data corresponding to the value of the counter TgtCnt, which is received together with the instruction of recording a still image.

Figure 4:
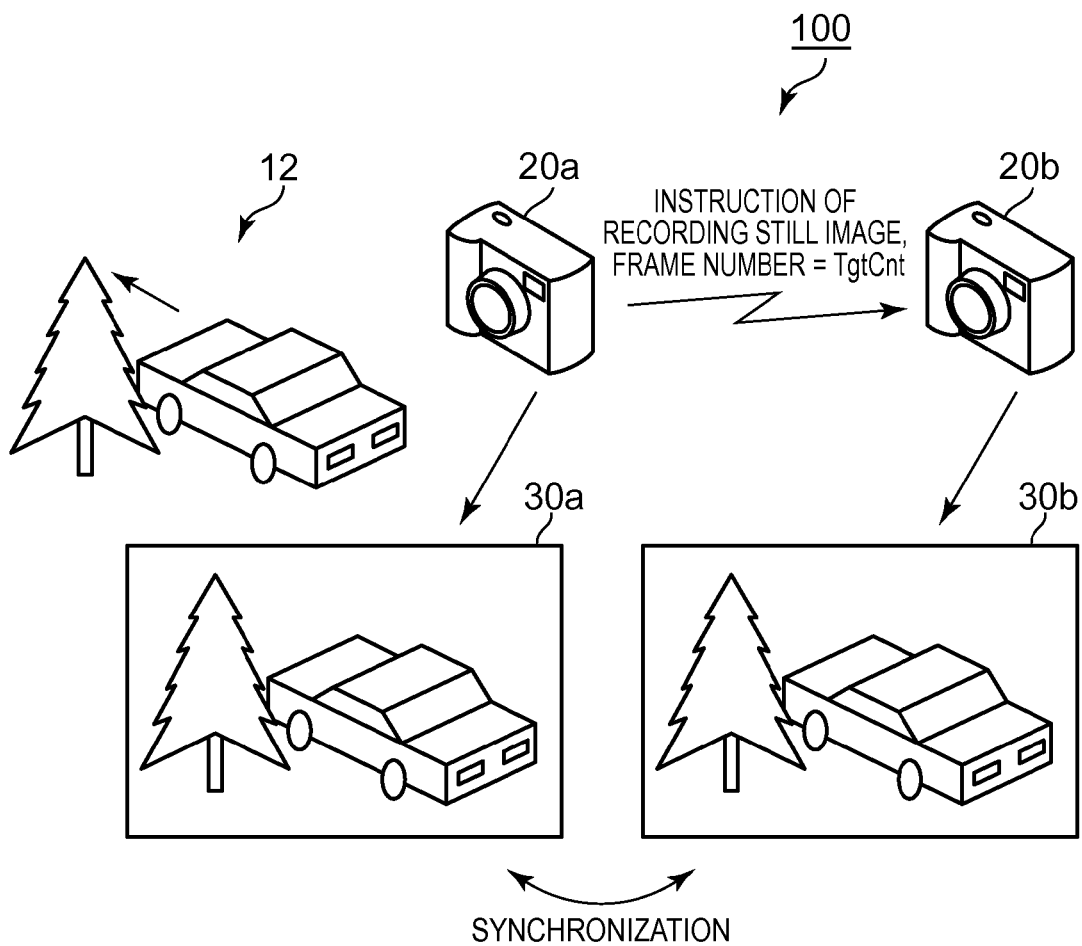
FIG. 4 is a conceptual diagram showing the image pickup system 100 using the image pickup apparatuses 20a, 20b, for taking images in synchronization.
Figure 5:
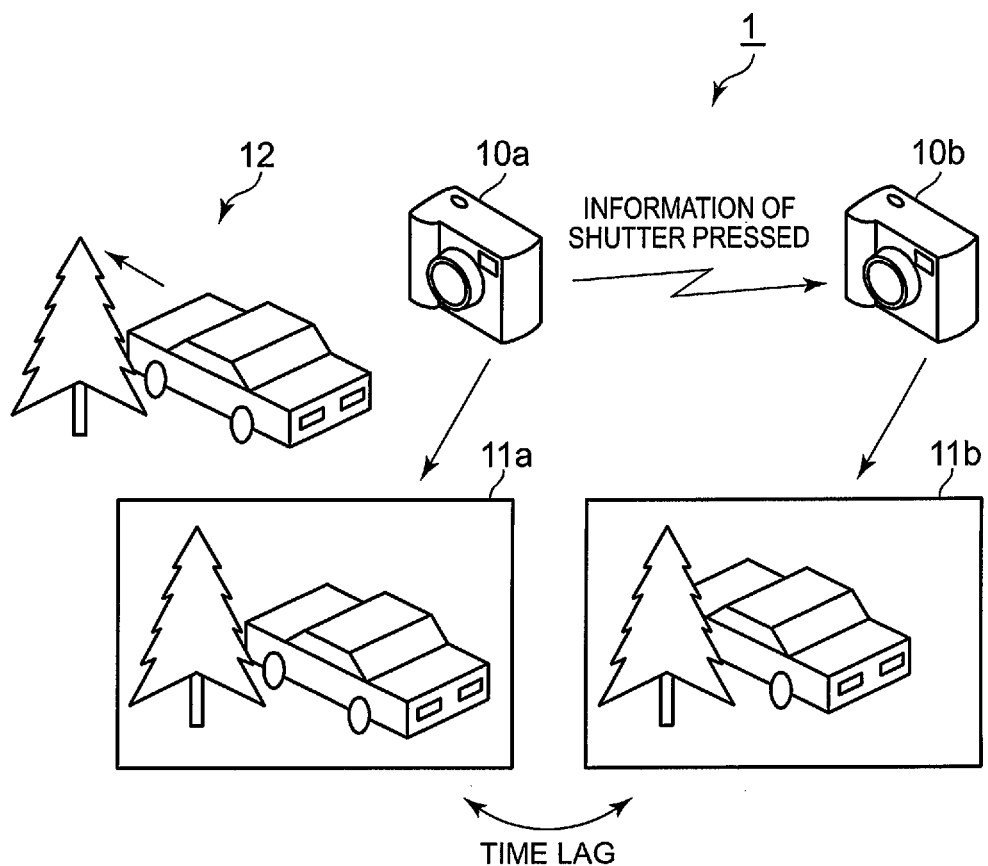
FIG. 5 is a conceptual diagram for explaining a conventional image pickup system 1, which uses plural image pickup apparatuses to take images in synchronization.

FIG. 4 is a conceptual diagram prepared for explaining a synchronous image taking operation performed by the image pickup system 100 using the image pickup apparatuses 20a, 20b. In the image pickup system 100 shown in FIG. 4, BT devices 21a, 21b generate BT synchronous signals sync 1a, sync 1b based on the common radio synchronous signal, respectively. Further, TG (Timing Generators) 23a, 23b generate the image-pickup synchronous signals sync 2a, sync 2b synchronized with BT synchronous signals sync 1a, sync 1b, respectively. Then, the image pickup apparatuses 20a, 20b obtain and store the image pickup data 30a, 30b based on the image-pickup synchronous signals sync 2a, sync 2b, respectively. Therefore, it will be understood that the image pickup data 30a, 30b obtained in the above manner are precisely synchronized with each other.

In the present embodiment, when the generations of the image-pickup synchronous signals sync 2a, sync 2b of TG (Timing Generators) 23a, 23b in the image pickup apparatuses 20a, 20b are made to synchronize with the communication controlling timing of BT devices 21a, 21b, that is, when the timings of the image-pickup controlling operations of the image sensors 24a, 24b are made to synchronize with the timing of the communication controlling operation of BT devices 21a, 21b, plural image pickup apparatuses will be able to take images in accurate synchronization.

Further, in the present embodiment, the image pickup system 100 uses the image pickup apparatus 20a as the master device and the other image pickup apparatus 20b as the slave device, but when additional image pickup apparatuses are used, operating as the slave device in the same fashion as the image pickup apparatus 20b, a number of image pickup apparatuses can be used for taking images in synchronization.

In the present embodiment, the example of the synchronous recording operation of still images has been explained, but moving images can be recorded in synchronization.

Although specific embodiments of the invention have been described in the foregoing detailed description, modifications and rearrangements may be made to the disclosed embodiments while remaining within the scope of the invention as defined by the following claims. It is intended to include all such modifications in the following claims and their equivalents.

What is claimed is:

1. An image pickup apparatus comprising:
   an image pickup sensor for taking an image to obtain image data;
   a communication device for communicating with another image pickup apparatus in synchronization, wherein the communication device generates, based on a timing of a synchronous operation, a synchronous signal for performing communication between the image pickup apparatus and the another image pickup apparatus at a same timing, and outputs the synchronous signal;
   an image-pickup synchronous signal generator for obtaining the synchronous signal generated and output by the communication device and for generating, by using the obtained synchronous signal, an image-pickup synchronous signal which has a predetermined cycle and which is also separately generated by the another image pickup apparatus at a same timing, wherein the image-pickup synchronous signal is synchronized with the synchronous signal obtained from the communication device; and
   an image-pickup controlling circuit for determining, in accordance with the image-pickup synchronous signal generated by the image-pickup synchronous signal generator, image-pickup timings at which the image pickup sensor obtains image data.

2. An image pickup apparatus comprising:
   an image pickup unit for taking an image to obtain image data;
   a storing unit for storing data; and
   a CPU which is operable as units comprising:
      a communication unit for communicating with another image pickup apparatus in synchronization;
      an image-pickup synchronous signal generating unit for generating an image-pickup synchronous signal which has a predetermined cycle and which is also separately generated by the another image pickup apparatus at a same timing, wherein the image-pickup synchronous signal is synchronized with a timing of a synchronous operation by the communication unit;
      an image-pickup controlling unit for determining, in accordance with the image-pickup synchronous signal generated by the image-pickup synchronous signal generating unit, image-pickup timings at which the image pickup unit obtains image data;
a counting unit for counting a number of frames of image data which are obtained by the image pickup unit at the image-pickup timings determined by the image-pickup controlling unit;
an operating unit for outputting an instruction to perform an image-pickup operation;
an obtaining unit for obtaining a count value which has been counted by the counting unit at a time at which the instruction is output from the operating unit; and
a recording controlling unit for associating the image data obtained by the image pickup unit at the time at which the instruction is output from the operating unit with the count value obtained by the obtaining unit, and for storing the image data associated with the count value in the storing unit.

3. The image pickup apparatus according to claim 2, wherein the CPU is further operable as units comprising:
an instruction signal generating unit for generating an instruction signal for giving the another image pickup apparatus an instruction of obtaining and recording image data in synchronization with the image-pickup timing, when the instruction is output from the operating unit; and
a sending unit for sending, to the another image pickup apparatus, the count value obtained by the obtaining unit together with the instruction signal generated by the instruction signal generating unit.

4. The image pickup apparatus according to claim 3, wherein the sending unit is realized by a sending function of the communication unit.

5. The image pickup apparatus according to claim 4, wherein the CPU is further operable as a receiving unit for receiving the count value together with the instruction signal from the another image pickup apparatus, and
wherein the recording controlling unit stores, in the storing unit, the image data obtained by the image pickup unit and corresponding to the count value received together with the instruction signal, when the receiving unit receives the instruction signal from the another image pickup apparatus.

6. The image pickup apparatus according to claim 5, wherein the receiving unit is realized by a receiving function of the communication unit.

7. An image pickup system including at least a first image pickup apparatus and another image pickup apparatus, the first image pickup apparatus and the another image pickup apparatus being configured to obtain image data in synchronization, wherein the first image pickup apparatus and the another image pickup apparatus each comprise:
an image pickup unit for taking an image to obtain image data;
a storing unit for storing data; and
a CPU which is operable as units comprising:
a communication unit for communicating with the other image pickup apparatus in synchronization;
a synchronous signal generating unit for generating a synchronous signal having a predetermined cycle and synchronized with a timing of a synchronous operation by the communication unit;
an image-pickup synchronous signal generating unit for generating an image-pickup synchronous signal having a predetermined cycle and synchronized with the synchronous signal generated by the synchronous signal generating unit;
an image-pickup controlling unit for determining, in accordance with the image-pickup synchronous signal generated by the image-pickup synchronous signal generating unit, image-pickup timings at which the image pickup unit obtains image data;
a counting unit for counting a number of frames of image data which are obtained by the image pickup unit at the image-pickup timings determined by the image-pickup controlling unit;
an obtaining unit for obtaining a count value which has been counted by the counting unit at a time at which an image-pickup operation is performed; and
a recording controlling unit for associating the image data obtained by the image pickup unit at the time at which the image-pickup operation is performed with the count value of the counting unit obtained by the obtaining unit, and for storing the image data associated with the count value of the counting unit in the storing unit;
wherein the CPU of the first image pickup apparatus is further operable as units comprising:
an operating unit for outputting an instruction to perform an image-pickup operation;
an instruction signal generating unit for generating an instruction signal for giving the another image pickup apparatus an instruction of obtaining and recording image data in synchronization with the image-pickup timing, when the instruction is output from the operating unit; and
a sending unit for sending, to the another image pickup apparatus, the count value of the counting unit obtained by the obtaining unit together with the instruction signal generated by the instruction signal generating unit,
wherein the CPU of the another image pickup apparatus is further operable as a receiving unit for receiving the count value of the counting unit together with the instruction signal from the first image pickup apparatus, and
wherein the recording controlling unit stores, in the storing unit, the image data which is obtained by the image pickup unit and corresponds to the count value of the counting unit received together with the instruction signal, when the receiving unit receives the instruction signal from the first image pickup apparatus.

8. An image pickup method in an image pickup apparatus, the method comprising:
an image pickup process of taking an image to obtain image data;
a communication process of communicating with another image pickup apparatus in synchronization;
a synchronous signal generating process of generating, based on a timing of a synchronous operation, a synchronous signal for performing communication between the image pickup apparatus and the another image pickup apparatus at a same timing, and outputting the synchronous signal;
an image-pickup synchronous signal generating process of obtaining the synchronous signal generated and output at the synchronous signal generating process, and of generating, by using the obtained synchronous signal, an image-pickup synchronous signal which has a predetermined cycle and which is also separately generated by the another image pickup apparatus at a same timing, wherein the image-pickup synchronous signal is synchronized with the obtained synchronous signal; and an image-pickup controlling process of determining, in accordance with the image-pickup synchronous signal generated at the image-pickup synchronous signal generating process, image-pickup timings at which image data is obtained at the image pickup process.

9. A non-transitory computer readable recording medium mounted on an image pickup apparatus, wherein the image pickup apparatus is provided with a computer and an image pickup unit sensor for taking an image to obtain image data, the non-transitory computer readable recording medium having recorded thereon a computer program which is executable to control the computer to perform processes comprising:

a communication process of communicating with another image pickup apparatus in synchronization;

a synchronous signal generating process of generating, based on a timing of a synchronous operation, a synchronous signal for performing communication between the image pickup apparatus and the another image pickup apparatus at a same timing, and outputting the synchronous signal;

an image-pickup synchronous signal generating process of obtaining the synchronous signal generated and output at the synchronous signal generating process, and of generating, by using the obtained synchronous signal, an image-pickup synchronous signal which has a predetermined cycle and which is also separately generated by the another image pickup apparatus at a same timing, wherein the image-pickup synchronous signal is synchronized with the obtained synchronous signal; and an image-pickup controlling process of determining, in accordance with the image-pickup synchronous signal generated at the image-pickup synchronous signal generating process, image-pickup timings at which image data is obtained at the image pickup process.

\* \* \* \* \*